(12) United States Patent
Kast

(10) Patent No.: US 9,835,251 B2
(45) Date of Patent: Dec. 5, 2017

(54) SEALING STRAND AND METHOD FOR PRODUCING SAME

(71) Applicant: CQLT SAARGUMMI TECHNOLOGIES S.À.R.L., Remich (LU)

(72) Inventor: Christian Kast, Merzig-Brotdorf (DE)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 0 days.

(21) Appl. No.: 15/311,909

(22) PCT Filed: Jun. 25, 2015

(86) PCT No.: PCT/EP2015/001283
§ 371 (c)(1),
(2) Date: Nov. 17, 2016

(87) PCT Pub. No.: WO2016/012073
PCT Pub. Date: Jan. 28, 2016

(65) Prior Publication Data
US 2017/0082198 A1    Mar. 23, 2017

(30) Foreign Application Priority Data
Jul. 25, 2014   (DE) .................. 10 2014 110 541

(51) Int. Cl.
*B29C 47/00* (2006.01)
*F16J 15/10* (2006.01)
(Continued)

(52) U.S. Cl.
CPC ......... *F16J 15/108* (2013.01); *B29C 47/0004* (2013.01); *B29C 47/0016* (2013.01); *B29C 47/0064* (2013.01); *B29C 65/4825* (2013.01); *B29C 65/50* (2013.01); *B60J 10/35* (2016.02); *B60J 10/45* (2016.02); *F16J 15/061* (2013.01);
(Continued)

(58) Field of Classification Search
CPC . B60J 10/246; B60J 10/35; B60J 10/84; B60J 10/0077; B60J 10/0011; B60R 13/06; F16J 15/104
See application file for complete search history.

(56) References Cited

U.S. PATENT DOCUMENTS

| | | | |
|---|---|---|---|
| D372,074 S * | 7/1996 | Wallace | .............. D23/269 |
| 2014/0352225 A1* | 12/2014 | Kast | ............ B60J 10/08 49/475.1 |
| 2015/0175092 A1* | 6/2015 | Thome | ............ B60R 13/06 277/637 |

FOREIGN PATENT DOCUMENTS

| | | |
|---|---|---|
| DE | 102006032139 A1 | 8/2007 |
| EP | 1891677 A2 | 2/2008 |
| FR | 2543486 A1 | 10/1984 |

* cited by examiner

*Primary Examiner* — Gilbert Y Lee
(74) *Attorney, Agent, or Firm* — Lucas & Mercanti, LLP; Klaus P. Stoffel

(57) ABSTRACT

A sealing strand for producing a seal by connection of the sealing thread with a strand seat that extends along a gap to be sealed, wherein the sealing strand has a tape region provided for bonding to the strand seat. During stretching of the sealing strand in the longitudinal direction of the strand, the tensile stress corresponding to the stretching in the tape region is at least partly compensated or capable of being compensated. This is achieved by the strand region being connected under compression with the remaining sealing strand.

12 Claims, 1 Drawing Sheet

(51) Int. Cl.
*F16J 15/06* (2006.01)
*B60J 10/35* (2016.01)
*B60J 10/00* (2016.01)
*B29C 65/48* (2006.01)
*B29C 65/50* (2006.01)
*B29K 21/00* (2006.01)
*B29K 621/00* (2006.01)
*B29L 31/26* (2006.01)

(52) U.S. Cl.
CPC ........... *F16J 15/102* (2013.01); *F16J 15/104* (2013.01); *B29K 2021/00* (2013.01); *B29K 2621/00* (2013.01); *B29L 2031/26* (2013.01)

SEALING STRAND AND METHOD FOR PRODUCING SAME

The present application is a 371 of International application PCT/EP2015/001283, filed Jun. 25, 2015, which claims priority of DE 10 2014 110 541.9, filed Jul. 25, 2014, the priority of these applications is hereby claimed and these applications are incorporated herein by reference.

BACKGROUND OF THE INVENTION

The invention relates to a sealing strand for forming a seal by connecting the sealing strand to a strand seat that extends along a gap to be sealed, wherein the sealing strand comprises a tape region that is provided for adhesively bonding to the strand seat. The invention furthermore relates to a method for producing such a sealing strand.

Adhesively bonding a sealing strand having a double-sided adhesive tape, for example, to a strand seat having, for example, an adhesive area for receiving the sealing strand that encircles a vehicle door by the roller-application method is preferably performed under slight elongation of the sealing strand. This elongation often facilitates accurate placing of the sealing strand on the strand seat. On the other hand, tensile stress on the sealing strand that has been introduced into the adhesive bonding compromises the quality of the adhesive connection. Releasing of the adhesive connection may arise in particular in regions in which the sealing strand has been installed in a curved manner.

SUMMARY OF THE INVENTION

The invention is based on the object of providing a new sealing strand of the type mentioned at the outset, and a method for producing the same, wherein the sealing strand may be processed under tensile stress while providing improved quality of the adhesive bonding to a strand seat.

The sealing strand according to the invention that achieves this object is characterized in that, upon elongation of the sealing strand in the longitudinal direction of the strand, the tensile stress corresponding to the elongation is at least partially compensated for or is capable of being compensated for in the tape region.

When processing the sealing strand under elongation it is preferably achieved that the tensile stress in that tape region of the sealing strand that is adjacent to the sealing seat, in relation to the tensile stress corresponding to the elongation, is at least reduced, compensated for, or even overcompensated for.

It has been found that a reduction in the tensile stress that is limited to that region that is adjacent to the strand seat is already sufficient for preventing the quality of the adhesive connection being compromised.

In order for the tensile stress in that tape region of the sealing strand that is adjacent to the strand seat to be compensated for, the tape region may be compressed such that upon elongation of the sealing strand in the tape region only a cutback in terms of the degree of compensation is optionally performed, with no tensile stress at all arising.

Alternatively, the creation of tensile stress in the tape region upon elongation of the sealing strand in the longitudinal direction of the strand may be compensated for by swelling of the tape region in the course of the adhesive bonding of the sealing strand to the strand seat. Activation and/or release of a chemical substance that triggers the swelling procedure may be possible by the influence of heat, by pressing the sealing strand onto the strand seat, and/or by elongating the sealing strand in the course of the adhesive bonding.

While it would be conceivable for the tape region to be produced, for example, as a foamed peripheral region, by way of extrusion in one operation cycle together with the remaining sealing strand, the tape region in one preferred embodiment of the invention, is formed by a separate tape that is connected, in particular adhesively bonded, to an elastomer strand that forms the remaining sealing strand.

In one particularly preferred embodiment, this is a double-sided adhesive tape that is adhesively bonded to the remaining sealing strand. However, a tape that is made without a prefabricated adhesive layer by the producer of the sealing, and that comes into contact with the adhesive material only during the adhesive bonding to the strand seat would also be possible. Such a tape could also be welded to the remaining sealing strand, for example.

In order for the sealing strand to be produced, the tape may be compressed in the course of being connected to the remaining sealing strand, or may be connected to the sealing strand at the outset as a compressed, prefabricated tape.

In the latter case, and when a double-sided adhesive tape is utilized, the cover strip that is usually used for protecting an adhesive layer of the adhesive tape may be utilized to keep the double-sided adhesive tape in a compressed state.

The invention will be explained further hereunder by means of exemplary embodiments and by the appended drawings which relate to one of these exemplary embodiments. In the drawings:

DETAILED DESCRIPTION OF THE INVENTION

Figure 1:
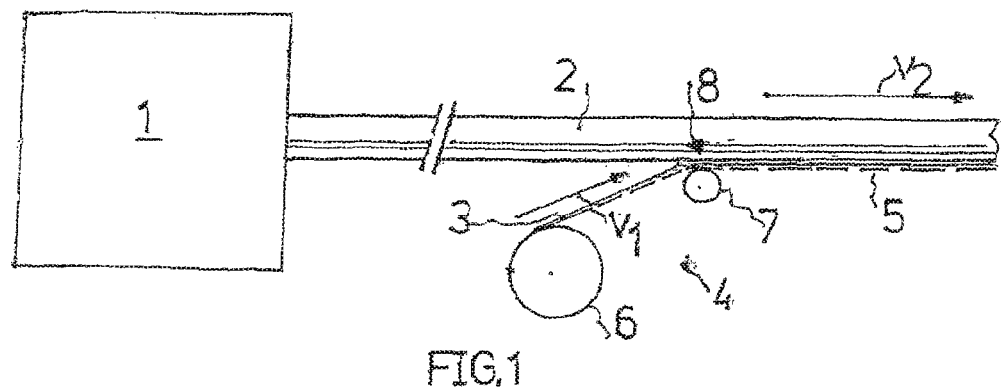
FIG. 1 shows an illustration explaining the production of a sealing strand according to the invention by the method according to the invention.

A production line for a sealing strand produced in an endless manner comprises an extrusion tool 1 which is schematically illustrated in FIG. 1. Downstream of the extrusion tool 1 in the direction of extrusion there are, apart from a vulcanizing or TPE-calibrating section (not shown), installations 4 for connecting an extruded elastomer strand 2, forming the sealing strand, to a double-sided adhesive tape 3, a protective cover strip 5, a so-called liner, being applied to the adhesive area of said tape that faces way from the elastomer strand 2.

The fabricated sealing strand in the example shown is intended for being dispatched to a vehicle manufacturer where the sealing strand is unwound from a shipping roll and is continuously fed to a processing installation for forming seals on vehicle doors.

The installations 4 comprise a reserve roll 6 on which the double-sided adhesive tape 3 having the cover strip 5 is wound, and contact roller 7 which at a connection point 8 presses the double-sided adhesive tape 3 onto the elastomer strand 2. Further transportation installations which convey the unwound adhesive tape 3 at an indexing velocity V1 to the connection point 8 are not shown in FIG. 1.

The mentioned indexing velocity V1 exceeds the extrusion velocity V2 at which the elastomer strand 2 moves in the extrusion direction. Thus a greater length of the double-sided adhesive tape 3 is apportioned to each specific length of the extruded elastomer strand 2, and the double-sided adhesive tape 3 by way of the transportation installations (not shown) and the pressure roller 7 is adhesively bonded under compression to the elastomer strand 2.

Figure 2:
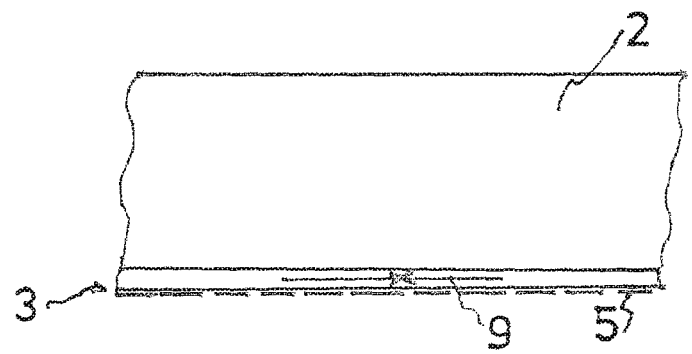
FIG. 2 shows a partial view of a sealing strand produced according to FIG. 1.

The compression of the double-sided adhesive tape 3, as is highlighted by a double arrow 9 in FIG. 2, is maintained by the adhesive bonding to the elastomer strand 2, wherein the elastomer strand 2 in turn is only insignificantly compressed by the compression of the double-sided adhesive tape 3.

As an alternative to the compression of the double-sided adhesive tape 3 in the course of the adhesive bonding to the elastomer strand 2, as has been described, the elastomer strand 2 could be adhesively bonded to the already compressed tape at the outset. Such a compressed tape may be prefabricated in that the tape strip of the double-sided adhesive tape that has the two adhesive areas is connected to the cover strip 5 in the compressed state, wherein the cover strip 5 retains the tape strip having the two adhesive areas in the compressed state, the cover strip 5 being under slight tensile stress.

Figure 3:
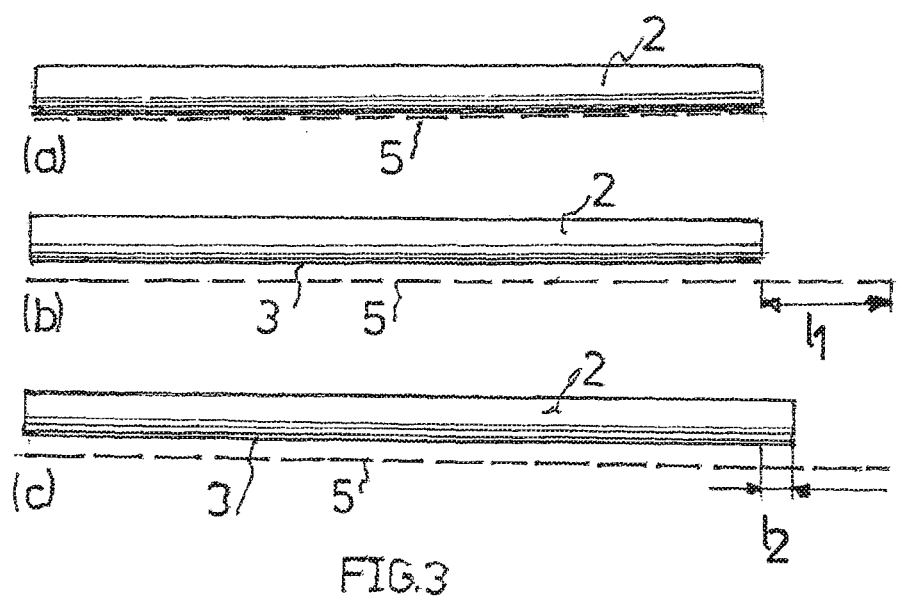
FIG. 3 shows an illustration explaining the behavior of a sealing strand produced as per FIG. 1, during the processing thereof.

During processing of the sealing strand as shown in FIG. 3a to form a seal by adhesive bonding to a sealing seat that extends along a vehicle-door gap, the cover strip 5 is removed according to FIG. 3b. Said cover strip 5, when released from the compressed double-sided adhesive tape, elongates in a manner corresponding to the previous compression thereof by the length l1. The length of the drawn-off liner would not be significantly reduced if a pre-compressed double-sided adhesive tape were to be used.

The sealing strand in the course of being adhesively bonded to the strand seat is slightly elongated by the length l2, this being favorable for a process-reliable application procedure. In the absence of suitable countermeasures, adhesive bonding of the sealing strand that is under tensile stress to the strand seat would compromise the strength and/or the durability of the adhesive bond. This applies in particular to curved regions of the strand seat, and to regions of the sealing strand that are installed in a correspondingly curved manner.

Advantageously, the elongation by l2 as a result of the compression of the double-sided adhesive tape in the exemplary embodiment shown does not lead to any tensile stress in the adhesive tape. It is only the compression that is reduced.

It is to be understood that the tensile stress of the sealing strand, in a manner deviating therefrom, in the region of the double-sided adhesive tape could be precisely compensated for, or could be kept so as to be only slighter than in the elastomer strand than corresponds to the elongation of the sealing strand.

In any case, the state of tensile stress of those regions of the sealing strand that are directly adjacent to the strand seat is advantageously reduced, furthering long-lasting durability of the adhesive bond.

The invention claimed is:

1. A sealing strand for forming a seal by connecting the sealing strand to a strand seat that extends along a gap to be sealed, wherein the sealing strand comprises a tape region provided for adhesively bonding to the strand seat in a state in which the sealing strand is slightly stretched in a longitudinal direction of the sealing strand, wherein, upon elongation of the sealing strand in the longitudinal direction tensile stress corresponding to the elongation is at least partially neutralized in the tape region by prefabricating the sealing strand with the tape region under compression of the tape region in a longitudinal direction of the tape region or by subsequent extension of the tape region in the longitudinal direction after adhesive bonding to the strand seat.

2. The sealing strand according to claim 1, wherein the tape region is connected to a remainder of the sealing strand by way of compression in the longitudinal direction of the strand.

3. The sealing strand according to claim 2, wherein the remainder of the sealing strand comprises an elastomer strand, and that the tape region is connected to the elastomer strand.

4. The sealing strand according to claim 3, wherein the tape region is adhesively bonded to the elastomer strand.

5. The sealing strand according to claim 1, wherein the tape region has an adhesive area protected by a cover.

6. The sealing strand according to claim 5, wherein the cover is connected to the adhesive area under tensile stress.

7. The sealing strand according to claim 1, wherein the tape region is formed by a double-sided adhesive tape.

8. A method for producing a sealing strand for forming a seal by connecting the sealing strand to a strand seat that extends along a gap to be sealed, the method comprising the steps of: providing the sealing strand with a tape by which the sealing strand is adhesively bondable to the strand seat; and connecting the tape to a remainder of the sealing strand under compression of the tape in a longitudinal direction of the tape, or connecting the tape to the remaining sealing strand in a state in which the tape is thus compressed.

9. The method according to claim 8, including connecting the tape to an extruded elastomer strand of the sealing strand.

10. The method according to claim 9, including adhesively bonding the tape to the extruded elastomer strand.

11. The method according to claim 9, wherein the tape is continuously connected to the extruded elastomer strand, and is infed to a connection point at an indexing velocity that exceeds an extrusion velocity of the elastomer strand.

12. The method according to claim 9, wherein the tape, prior to connection to the remainder of the sealing strand, is held in a compressed state by a cover, under tensile stress, of an adhesive area of the tape that is provided for adhesively bonding to the strand seat.

* * * * *